United States Patent [19]

Null

[11] Patent Number: 5,316,110
[45] Date of Patent: May 31, 1994

[54] TRAILER BRAKE SYSTEM WITH RELEASE APPARATUS

[76] Inventor: Robert L. Null, Rte. 1, Box 344, Willow Wood, Ohio 45696

[21] Appl. No.: 856,544

[22] Filed: Mar. 24, 1992

[51] Int. Cl.$^5$ ................................................ B60T 7/20
[52] U.S. Cl. .............................. 188/112 R; 188/370; 188/73.42; 303/7
[58] Field of Search ............... 188/71.1, 112 R, 70 B, 188/72.3, 72.4, 72.6, 82.1, 82.3, 82.34, 82.9, 368-370, 328, 73.32, 73.39; 303/7, 8, 68, 24.1

[56] References Cited

U.S. PATENT DOCUMENTS

| | | | |
|---|---|---|---|
| 3,746,132 | 7/1973 | Jewell, Jr. | 188/112 R |
| 3,754,623 | 8/1973 | Gatt | 188/112 R |
| 3,973,655 | 8/1976 | Mollard | 188/328 |
| 4,267,903 | 5/1981 | Kita et al. | 188/370 X |

FOREIGN PATENT DOCUMENTS

| | | | |
|---|---|---|---|
| 0228812 | 7/1987 | European Pat. Off. | 188/370 |
| 3221320 | 12/1983 | Fed. Rep. of Germany | 188/112 R |

*Primary Examiner*—Robert J. Oberleitner
*Assistant Examiner*—Josie A. Ballato
*Attorney, Agent, or Firm*—King & Schickli

[57] ABSTRACT

A trailer brake system includes a disc brake assembly for each wheel including apparatus to provide release of the brake pads from engagement with the rotor upon backing. In the preferred braking system, one master brake assembly is provided for braking one wheel and a slave brake assembly for braking a second wheel of the trailer; a self-contained hydraulic cylinder being provided for moving the pads into and out of engagement with the rotor. Each brake assembly includes a stationary bracket for attachment to the axle and a caliper unit with the brake pads mounted by a single pivot pin on the bracket. A relief valve is engaged by the pivoting caliper unit to provide the release of the brake pads. The housing of the caliper unit is in two sections and mounted adjacent the top of the rotor. The bracket includes a support ring for direct mounting on the axle and an integral yoke above the ring; one arm of the yoke limiting the pivoting movement of the caliper unit in one direction by a fixed stop for forward movement/normal braking of the trailer, and the other arm supporting an actuator stop for the relief valve engaged by pivoting in the opposite direction. A spring constantly urges the caliper unit toward the fixed stop.

12 Claims, 4 Drawing Sheets

TRAILER BRAKE SYSTEM WITH RELEASE APPARATUS

TECHNICAL FIELD

This invention relates generally to hydraulically operated disc brake systems for a trailer or other towed vehicle; and, more particularly, to a system including a disc brake assembly providing efficient braking during forward movement and automatic release upon backing.

BACKGROUND OF THE INVENTION

Over the years, there have been many proposals for applying braking action to the wheels of a trailer or other towed vehicle. Many of these systems have utilized hydraulic braking action, similar to standard braking systems on automotive vehicles. However, in spite of substantial technical advances in automotive type systems, few true advances in technology have occurred for these trailer braking systems. With today's highway traffic safety regulations becoming more and more stringent, improved braking for trailers is becoming a necessity.

At the present time, the most widely used trailer braking system is an electro-mechanical system that is activated by the rearward force transmitted to the tongue of the trailer when the brakes of the towing vehicle are applied. A mechanical transducer senses the force along the tongue and, in turn, activates the brake cylinders to apply hydraulic pressure to the brake pads. The hydraulic pressure is actually generated by a master cylinder integral with or mounted on the trailer tongue.

In order to permit backing of the trailer, these systems that are in wide use today include an electrical solenoid for rendering the hydraulic system ineffective. This disabling action takes place in response to activation of the backup lights of the towing vehicle. Of course, because of this feature, an electrical connection must be made between the backup lights and the solenoid each time the trailer is hitched to the towing vehicle.

In addition to the requirement to make this connection being inconvenient, it has been found in practice that the electrical coupling is often damaged, such as by inadvertent tugging on the wires, and during the long periods of non-use, due to such factors as weather-related corrosion of the electrical contacts. In addition to likely malfunction of the trailer braking system, this added electrical load and the possibility of a short sometimes causes malfunction in the towing vehicle's electrical system. Furthermore, if the driver forgets to make the electrical connection or the connection is faulty, substantial damage can be done to the trailer upon backing when the brakes engage. Under possible extreme conditions, the trailer can be caused to jackknife and even overturn due to the brakes grabbing and locking up. An example in the prior art of this type of electro-mechanical braking system is shown in the Gatt U.S. Pat. No. 3,754,623 issued Aug. 28, 1973.

Competitors of the electro-mechanical braking system have attempted to solve these problems, and others, by converting to a fully hydraulically operated apparatus. A representative patent showing this type of system is the Jewell U.S. Pat. No. 3,746,132, issued Jul. 17, 1973. This type of system has not gained acceptance due to various shortcomings, but due mainly to an inefficient manner of mounting the brake assembly on the wheel spindle on the towed vehicle.

Also, the activation and deactivation of the brakes in the Jewell type system has in the past been generally unreliable due, in part, to the reliance on slotted mounts to provide relative movement for activation of the release valve unit, and in general unstable mounting of the valve unit. Buildup of road dirt and debris between the moving surfaces and in the open slots has proven to contribute to inefficient operation. These problems have in effect been instrumental in leading the industry to accept the electro-mechanical systems of the type shown in the Gatt '623 patent, along with its shortcomings as described above.

SUMMARY OF THE INVENTION

It is accordingly a primary object of the present invention to provide an improved braking system of the self-contained hydraulic type that is not subject to the shortcomings of the prior art.

It is an important object of the present invention to provide a braking system utilizing a disc brake assembly having a built-in mechanism for providing release of the brake pads from firm engagement with the rotor during backing, and not requiring any electrical interconnection with the towing vehicle.

It is another object of the present invention to provide a disc brake system for a trailer wherein the caliper unit is mounted on a pivot to provide more efficient release upon backing.

It is still another object of the present invention to provide a simplified approach for releasing the brakes during backing, thus providing for less initial expense but, at the same time, providing more efficient braking and releasing action.

Still another object of the present invention is to provide a disc brake assembly for a braking system for a trailer that provides for self-containment of the hydraulic system and simple pivoting action for release of the hydraulic pressure that actuates the brake pads.

It is still another object of the present invention to provide a disc brake assembly for a trailer or other towed vehicle utilizing an improved mounting arrangement provided by a novel bracket including a base ring and an integral yoke for positioning a caliper unit for pivotal action to release braking action upon backing.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objectives, and in accordance with the purposes of the present invention as described herein, a braking system including a disc brake assembly for a trailer or other towed vehicle is provided that incorporates an improved mechanism for release of the brake pads from the rotor during backing. A stationary bracket is mounted on the towed vehicle axle and supports the brake assembly in a unique manner. The hydraulic operating means for the brake assembly is self-contained and uniquely operable to provide the appropriate hydraulic pressure for either the braking or non-braking modes of vehicle operation.

Specifically, a caliper unit incorporating the brake cylinder and opposed brake pads is held on a single pivot pin for pivoting movement; in one direction engaging a fixed stop for forward movement and/or braking, and in the opposite direction engaging an adjustable actuator stop for non-braking. The non-braking mode is provided by opening a relief valve to release the braking engagement of the brake pads with the rotor. As will be seen more in more detail below, the braking system of the present invention is thus more effective to provide more efficient braking action during forward movement and release upon backing.

In the preferred embodiment, the self-contained hydraulic means for operating the brakes of the trailer is totally separate from the hydraulic brake system of the towing vehicle, as well as being separate from the electrical system of the vehicle. A stop sensor, which senses a surge of the trailer upon braking by the towing vehicle, may be mounted on or form an integral part of the tongue of the trailer. The sensor may, for example, include a telescoping arrangement that is effective to actuate a master cylinder, also on or forming an integral part of the trailer tongue. The hydraulic pressure generated by the master cylinder is fed through a feed line to a master disc brake assembly for braking one of the wheels of the trailer, usually the left front wheel. Each of the additional wheels, including both rear wheels when a tandem axle trailer is being equipped, are simultaneously braked by a slave disc brake assembly fed with hydraulic pressure from the same feed line, such as through a T coupling.

The brake assembly includes a housing divided into two sections; a first section housing the brake cylinder and one brake pad positioned adjacent the top of the rotor. The second section is a plate that is removable to allow servicing of the brakes, and incorporates the opposite pad.

The bracket for supporting the caliper unit in position on the trailer axle forms an important part of the present invention. The bracket includes a support ring for direct mounting on the axle housing; the wheel supporting spindle extending through the central opening of the ring. An integral yoke is provided above the ring and the pivot pin for supporting the caliper unit is positioned at a preferred intermediate location on the bracket, generally between the ring and the yoke. This positioning places the caliper unit within the opening between the two upstanding arms of the yoke; a fixed stop integral with one arm limiting the pivoting movement of the caliper unit during normal forward movement and/or normal braking action, and the other arm limiting movement during backing by engagement of the actuator plunger of the relief valve with an adjustable actuator stop. In addition, this opposite arm is provided with a spring actuated plunger operative to constantly urge the caliper unit in the direction against the fixed stop for the normal forward movement/normal braking modes.

The caliper unit is free to move axially along the pivot pin to provide self-centering of the pads with respect to the rotor during normal braking operation. This combined pivoting and single axis sliding joint is adapted for lubrication during normal servicing of the trailer to ensure smooth, non-sticking pivoting and in/out movement, thus assuring proper operation under all conditions. By being supported pivotally on a single axis, and at the same time for single axis in-and-out sliding motion, a substantial advantage is obtained over the prior art arrangements.

The pressurized fluid from the master cylinder is transmitted to the brake cylinder for actuating the piston through the feed line. A return line to the reservoir of the master cylinder is blocked by a two-way valve during normal braking operation.

The spring plunger maintains the caliper unit biased against the fixed stop on the yoke at all times. When the brake pads are actually engaging the rotor, the normal forward rotation of the rotor is in the same direction as this biasing force. The caliper unit thus firmly engages the stop, except during the backing mode.

As indicated above, the hydraulic pressure for the brake cylinder(s) is actually generated by the forward momentum of the trailer as the towing vehicle is braked or otherwise slows during the normal forward travel. Once the towing vehicle resumes forward speed, the piston of the master cylinder moves back to its home position, thereby relieving the hydraulic pressure and returning the caliper unit of the brake assembly to the non-braking position.

When the towing vehicle is backed, the force on the sensor and master cylinder on the tongue of the trailer is the same as during normal braking so that the braking action is initially the same. However, the two-way relief valve is opened by the valve element engaging the adjustable actuator stop allowing the hydraulic fluid to flow back to the non-pressurized reservoir in the master cylinder. With the pressure thus relieved, the trailer can be backed easily. The valve element proportions the flow to maintain the brake pads in light engagement with the rotor so that the caliper unit is held in the pivoted position and intermittent operation or jerking of the trailer is avoided.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
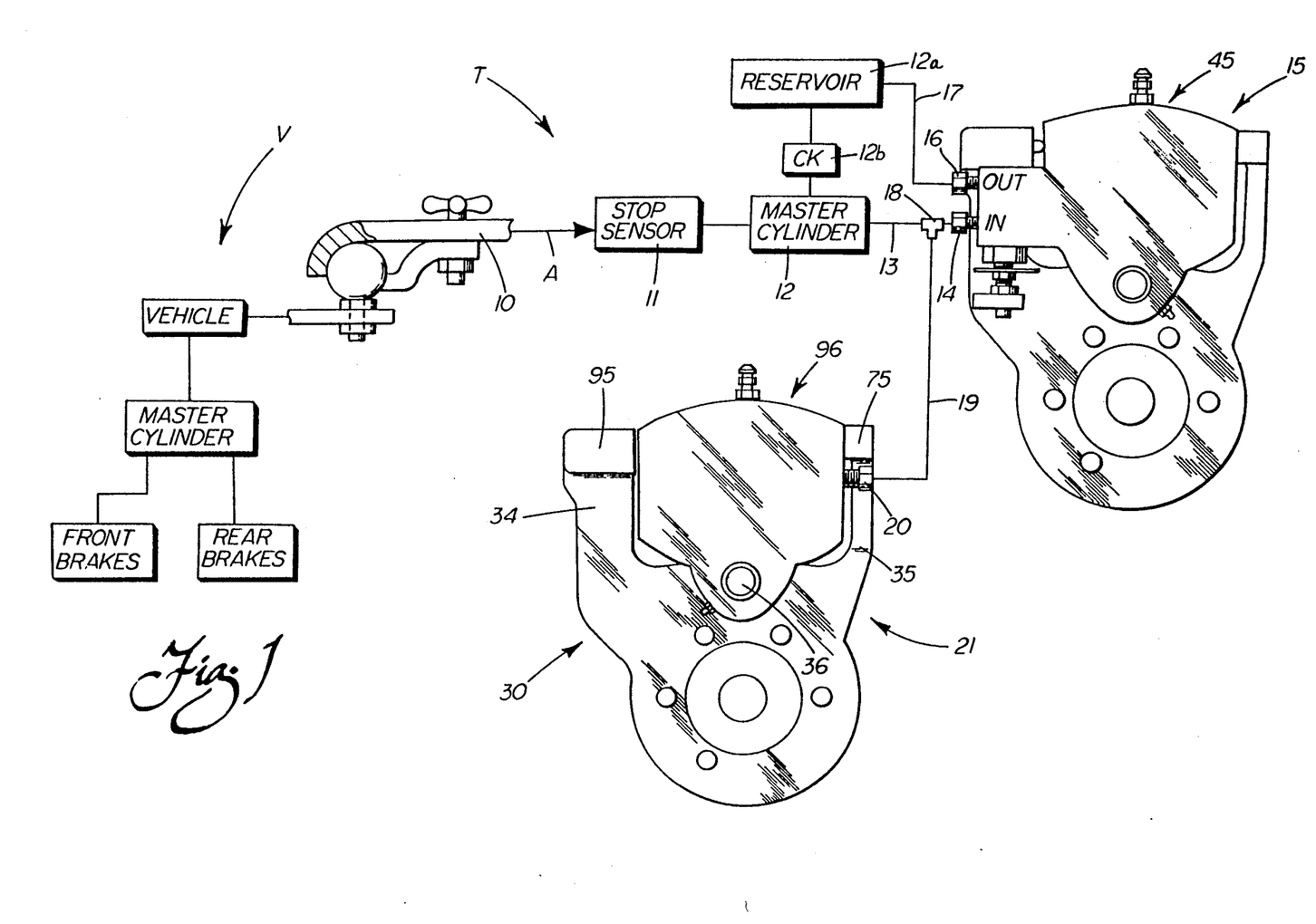
FIG. 1 is a schematic diagram of the braking system set up in accordance with the present invention and including one master brake assembly and one slave brake assembly suitable for a single-axle trailer.

Reference is now made to FIG. 1, wherein is shown an overall schematic view of a braking system set up according to the present invention. On the far left-hand side of this figure, there is shown in schematic form a vehicle V incorporating a conventional master cylinder, front brakes and rear brakes (not numbered). On the right-hand side is depicted a trailer or other towed vehicle T that may be connected by a conventional ball-type hitch to the towing vehicle V. As schematically shown, the trailer includes a tongue 10 incorporating a stop sensor 11, such as a telescoping joint and a master cylinder 12. As is conventional, the master cylinder 12 includes an integral reservoir 12a and check valve 12b to control the flow of fluid therebetween. As is apparent, when the towing vehicle V slows, the momentum of the trailer T tends to urge the tongue 10 in the forward direction. A counteracting force, denoted by the action arrow A, is operative to cause the stop sensor 11 to operate the master cylinder 12.

The master cylinder 12 in turn pressurizes hydraulic fluid in the feed line 13 which is connected to an inlet coupling 14 of a master brake assembly 15, incorporating important concepts of the present invention. A more detailed description of the brake assembly 15 follows in this description. An outlet coupling 16 is connected to a return line 17 to the reservoir 12a.

For a single axle trailer, it is desirable to provide braking action to both wheels. Accordingly, in the braking system shown in FIG. 1, a T coupling 18 is connected in the feed line 13 providing a branch of feed line 19 connecting an inlet coupling 20 on a slave brake assembly 21. Of course, additional T couplings can be provided on the feed line 13 for feeding additional slave brake assemblies when tandem axles are utilized. It is significant to note as the description progresses that only a single master brake assembly 15 is required in combination with a selected number of slave brake assemblies 21 (usually 1-3 assemblies) for efficient trailer braking action. A significant advantage is obtained by making the basic parts of the slave brake assembly 21 interchangeable with the master brake assembly 15 in a manner as can be realized by viewing the similarity of the two assemblies in FIG. 1.

Figure 2:
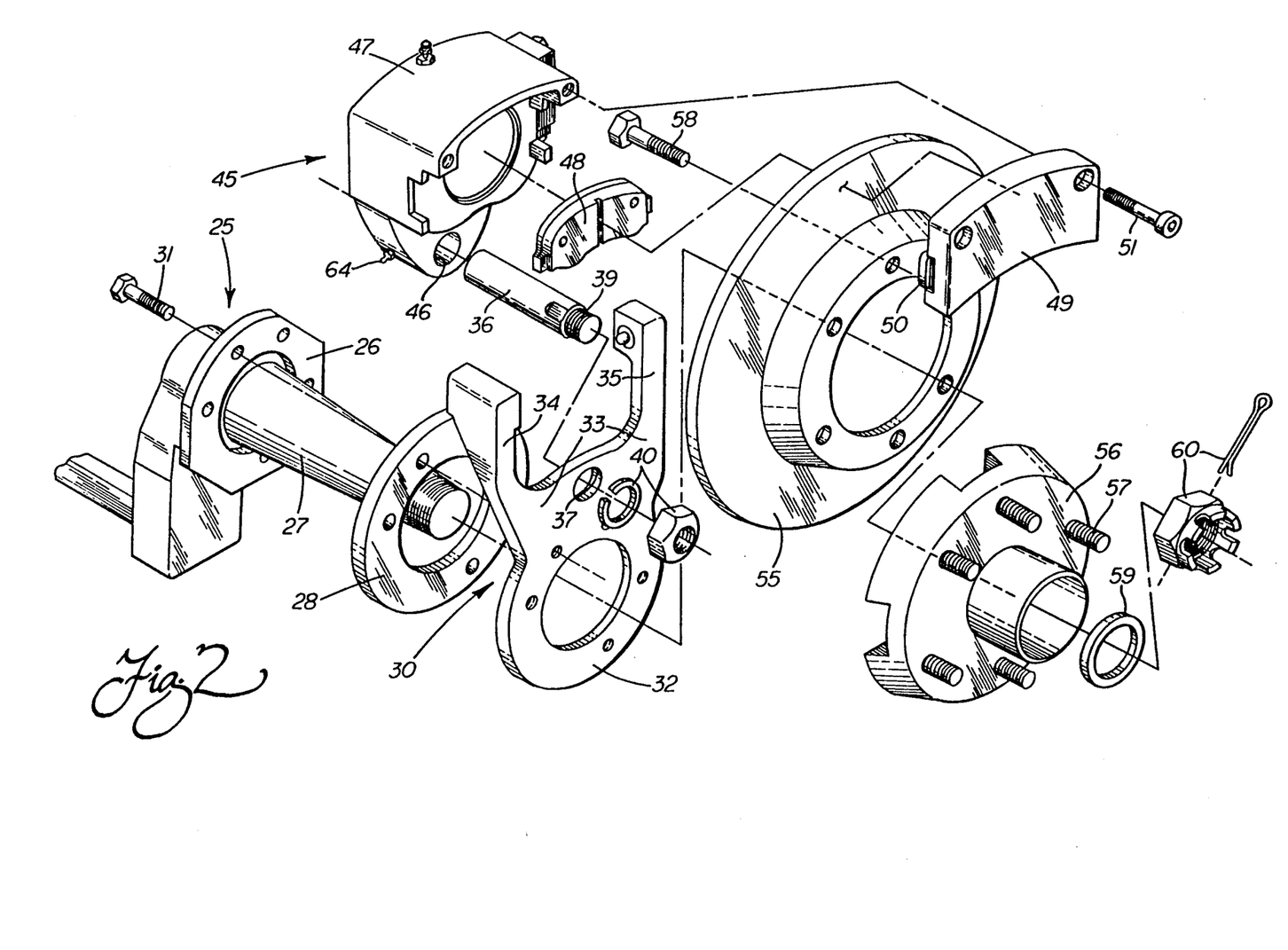
FIG. 2 is an overall exploded view of a master brake assembly of the present invention and illustrating the manner for mounting on an axle and the engagement with the brake rotor.

Proceeding to FIG. 2, an axle, generally designated by reference numeral 25, includes an integral axle housing 26 and non-rotary spindle 27. A spacer disc 28 mates with the axle housing 26 with the spindle 27 passing through the central opening thereof.

A stationary mounting bracket, generally designated by the reference numeral 30, is positioned over the spindle 27 and mounted by suitable fasteners, such as bolts 31 (only one shown). The bracket 30 includes a support ring 32 and integral yoke 33 defining spaced support arms 34, 35. A pivot pin 36 extends through an opening 37 generally between the support ring 32 and the yoke 33. A mounting shoulder is provided on the pin 36 adjacent a threaded end 39 which passes through the opening 37 and is mounted by a suitable lock washer and nut combination 40.

A caliper unit, generally designated by the reference numeral 45, includes a bore 46 that is received on the pivot pin 36. The caliper unit 45 includes a housing 47 including a first or main section for supporting a first brake pad 48, and a second section 49 in the form of a plate supporting a cooperating second brake pad 50. Suitable fasteners 51 (only one shown) connect the first and second sections 47, 49 of the housing together.

The pads 48, 50 engage opposite surfaces of annular braking rotor 55. A hub 56 with wheel mounting studs 57 is attached to the rotor by fasteners 58 (only one shown). Inside the hub 56 is a bearing assembly (not shown), which in turn engages the spindle 27. By the use of washer 59 and a castle nut and cotter pin combination 60, the hub and rotor is mounted for rotary motion induced by the wheel (not shown) and the assembly is completed.

Figure 3:
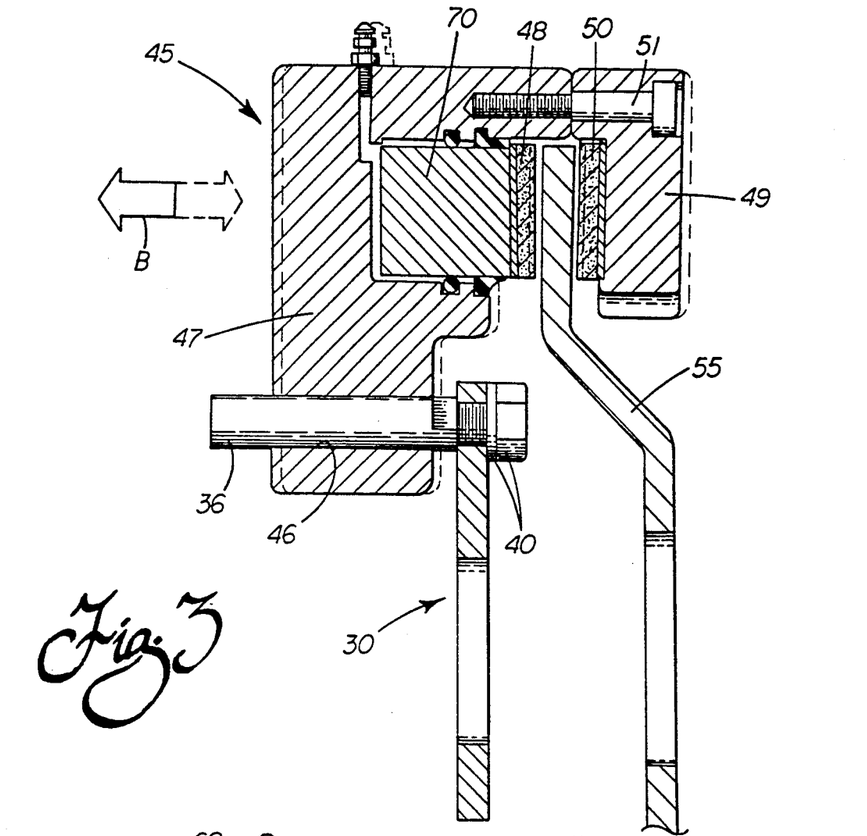
FIG. 3 is a cross-sectional view of a portion of the brake assembly showing the relationship of the disc brake pads to the rotor and the sliding, self-centering action along the pivot pin, the pads being in a released position for non-braking action.

A significant feature of the present invention is the manner in which the caliper unit 45 is mounted for single axle pivoting, as well as in and out single axle sliding motion on the pivot pin 36. The in and out sliding movement advantageously allows for stable, self-centering action with respect to the rotor 55. The motion is depicted by full line and dashed line outline, and corresponding action arrow B in FIG. 3. As the opposite brake pads 48, 50 are released from engagement, there is an automatic positioning away from the respective braking surfaces. The pads are induced to wear evenly and, as this occurs, the self-centering action is still maintained. The lock washer and nut combination 40 hold the pin 36 firmly in place on the mounting bracket 30.

Figure 4:
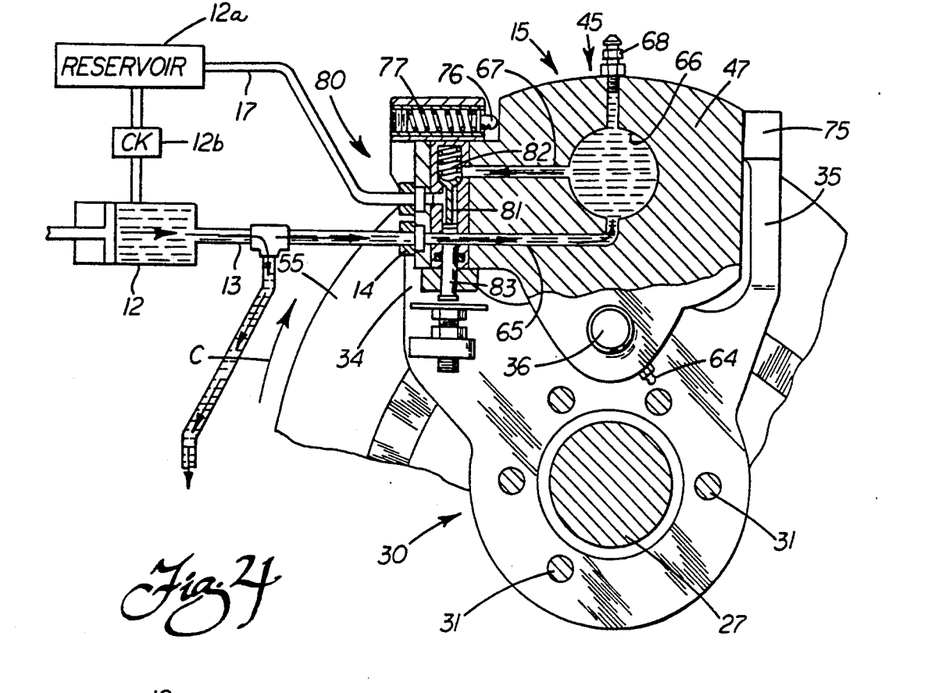
FIG. 4 is an overall side view with a portion of the caliper unit taken in section for illustrating detail, the view being taken from the left side of the trailer looking out and with the brake assembly being in the braking mode of operation with the rotor turning clockwise.

As illustrated in FIGS. 2 and 4, the bore 46 may be lubricated through a fitting 65 in order to maintain the desired sliding, as well as pivoting action, even under adverse road conditions. It will be noted that there are no open slots and guide pins provided between the caliper unit 45 and the mounting bracket 30, thus avoiding a significant problem of the prior art brake systems of this type.

As best shown in FIG. 4 of the drawings, assuming a position on the left side of the trailer looking out along the axis of the spindle 27, and taking a section close to the base of the spindle, the manner in which the mounting bracket 30 is positioned with respect to the rotor 55 can be further understood. It must be remembered that the fasteners 31 hold the bracket 30 stationary on the face of the axle housing 26. Assuming normal forward movement of the trailer T, the rotor 55 turns in a clockwise direction, in accordance with the action arrow C.

Figure 3A:
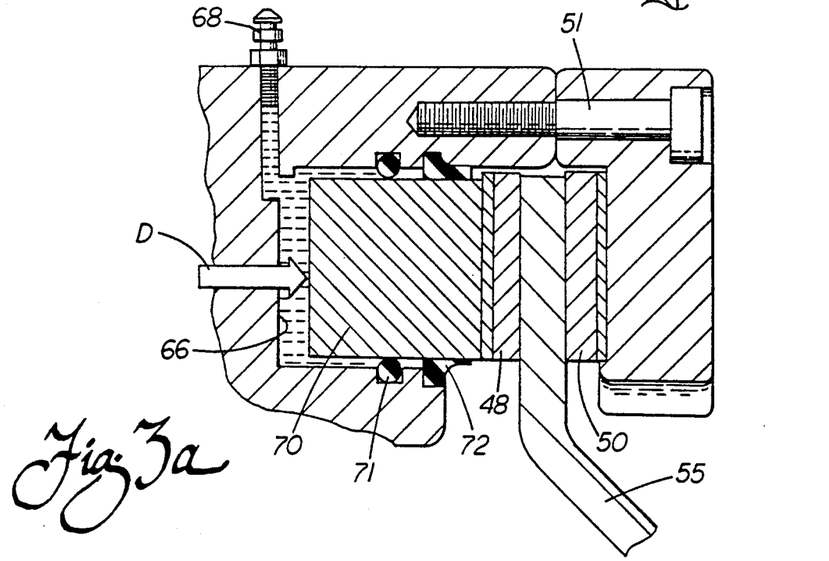
FIG. 3a is an enlarged cross-sectional view illustrating in more detail the portion of the brake assembly housing the brake cylinder/piston and showing the brake pads in an actuated position in engagement with the rotor as a result of applying hydraulic pressure.

The first section 47 of the caliper unit 45 is shown in cross-section, partially broken away. As illustrated, the feed line 13 from the master cylinder 12 is connected through coupling 14 to internal hydraulic feed passage 65 into internal brake cylinder 66. Connecting into the cylinder 66 is a hydraulic return passage 67, as well as a bleed passage/valve 68. By comparison of FIG. 4 with FIG. 3a, it will be realized that the brake cylinder 66 incorporates a piston 70 upon which is engaged the brake pad 48. Upon actuation of the piston 70, the pad 48 and the opposed brake pad 50 move in concert into braking engagement with the rotor 55, as previously described The brake cylinder 66 is sealed by an O-ring 71 and a suitable dirt and salt seal 72. The force of the hydraulic pressure acts against the back of the piston 70, as depicted by the action arrow D in this figure.

Returning to FIG. 4, during the normal braking mode of the brake assembly 15 as just described, the caliper unit 45 tends to rotate due to the frictional drag of the brake pads 48, 50 on the rotor 55. A fixed stop 75 on the top of the upstanding arm 35 limits this pivoting movement on pivot pin 36. Thus, the braking action is effective to slow and eventually assist in stopping the trailer T, as desired. At the same time, and indeed at all times, a plunger 76, positioned on the top of the opposite arm 34 of the yoke urges the caliper unit 45 in that direction, that is against the fixed stop 75. A spring 77 provides the resilient biasing action for this function.

Thus, when the need for braking during forward movement of the trailer is removed, the pressure provided by the master cylinder 12 is released and the neutral position of the master cylinder is again assumed. In response, the brake pads 48, 50 are drawn back from engagement with the rotor 55. At this time, the spring plunger 76 assures that the caliper unit 45 remains in the position for braking, that is snug against the stop 75.

Figure 4A:
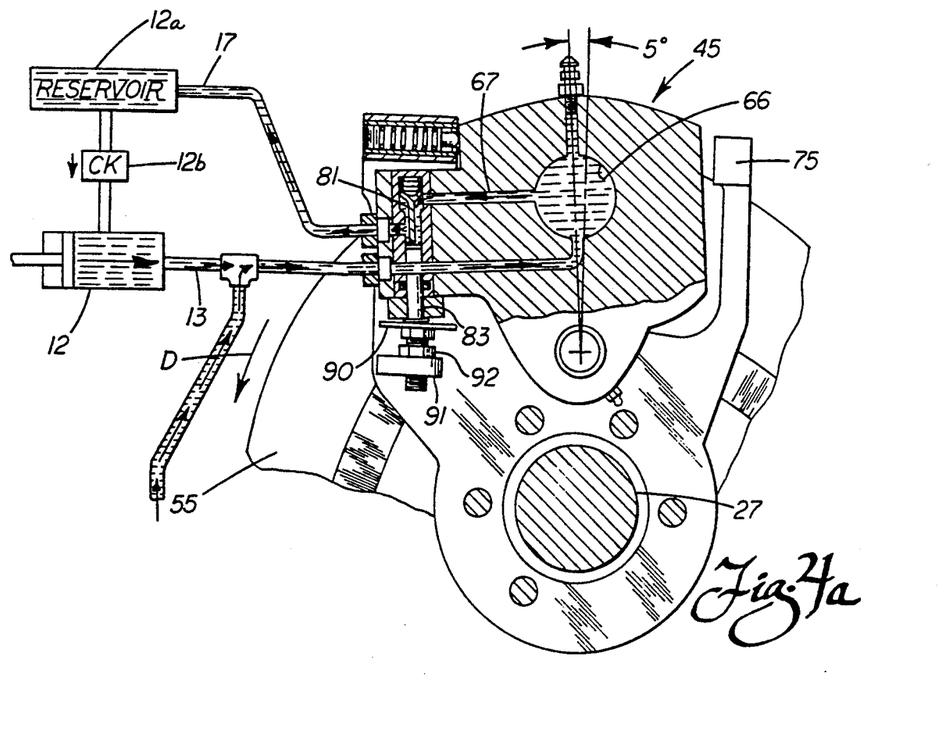
FIG. 4a is similar to FIG. 4 but with the caliper unit being pivoted so as to actuate the relief valve as the rotor is turned in the counterclockwise direction for backing, and thus providing the pressure relieved, non-braking mode.

A two-way relief valve, generally designated by the reference numeral 80, is mounted on the left-hand side of the caliper unit 45, as viewed in FIGS. 4 and 4a. A valve element 81 is urged into its seated position by a spring 82. Below the valve element is an actuator pin 83 operative when pushed from below to raise the valve element 81. In the seated position, it is clear that the pressurized hydraulic fluid in the brake cylinder 66 is trapped by the valve element 81 and cut off from the return line 17.

An actuator stop 90 is positioned on the arm 34 of the yoke 33 that forms the upper part of the mounting bracket 30; the stop being aligned with the actuator pin 83 of the relief valve 80. As the trailer T is backed up by the vehicle V, it will be realized that the tongue 10 is forced back to actuate the master cylinder 12 in the same manner as during the forward slowing and normal braking modes (see FIG. 4a). As the brake pads 48, 50 firmly engage the rotor 55, the frictional engagement pivots the caliper unit 45 away from the fixed stop 75. This occurs since the backing of the trailer T provides counterclockwise rotation of the rotor 55, as designated by the action arrow D in FIG. 4a. The actuator stop 90 is made adjustable by threadingly engaging the mounting ear 91, and is locked in place by the use of locking jam nut 92.

As the actuator pin 83 is raised by engagement with the stop 90, the valve element 81 is also raised, resulting in opening of the return passage 67 to the return line 17. This immediately releases the hydraulic pressure within the brake cylinder 66. As backing continues, the valve element 81 is capable of automatic regulation of the outflow of fluid from the return passage 67 just sufficient to release the firm braking engagement of the pads 48, 50 with the rotor 55. The pads are maintained in light contact so that as long as backing is in progress, the counterclockwise rotation of the rotor 55 keeps the caliper unit in the pivoted, pressure relief position of FIG. 4a. As indicated in FIG. 4, the preferred movement to provide the desired action is approximately five degrees.

As indicated above, the slave brake assembly 21 is made for economical purposes to be similar in design to the master brake assembly 15, but only the master brake assembly incorporates a relief valve 80. As illustrated in FIG. 1, the other major difference is that the mounting bracket 30 includes a fixed stop 95 on the arm 34. Thus, the slave caliper unit 96 is held against any pivoting action between the stop 95 and the opposite stop 75 on the arm 35. While pivoting action is restrained, the in and out movement along the mounting pin 36 is allowed in order to provide the self-centering function for the caliper unit 96.

The structure of the component parts of the braking system are designed for rugged, heavy duty use. The bracket 30 is preferably cast of ductile iron and the housing of the caliper units 45, 96 may be cast of bronze or other suitable materials. The configuration of the parts is simple in order to minimize the casting and machining operations, which provides a substantial advantage over the braking systems of the prior art.

In summary, it will now be realized that the braking system utilizing the disc brake assembly 15, as illustrated and described, not only provides substantially improved design features, but also significant functional advantages. The caliper unit 45 is mounted for pivoting action on the single pivot pin 36 to allow backing, as well as in and out sliding action to allow self-centering of the pads 48, 50. The caliper unit 45 is held on the mounting bracket 30 without slotted mounts, thus assuring reliable and efficient movement. The mounting bracket 30 includes a support ring 32 to be attached directly to the axle housing 26 and an integral yoke 33 with spaced support arms 34, 35 for the caliper unit 45.

A fixed stop 75 and a spring biased plunger 76 work in concert to maintain the caliper unit in the proper position for normal forward movement and braking action. Upon backing, the hydraulic pressure within the brake cylinder 66 is released by the relief valve 80, in response to the frictional force on the pads 48, 50 pivoting the caliper unit 45.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A braking system including a disc brake assembly having brake pads for a trailer or other towed vehicle to provide release of the brake pads from firm braking engagement with a rotor upon backing comprising:

a stationary mounting bracket for attachment to the vehicle for supporting the disc brake assembly;

self-contained hydraulic means for moving the pads into and out of engagement with the rotor in responses to the presence and absence of hydraulic pressure for forward braking and backing non-braking modes of vehicle operation, respectively;

a caliper unit including a housing for mounting said pads for relative movement toward and away from said rotor and into and out of engagement therewith;

said hydraulic means including a piston within a brake cylinder in said housing in operative engagement with at least one of said pads to provide said relative movement;

a single pivot pin for securely mounting said caliper unit to said mounting bracket, said pivot pin defining an axis for stable pivoting movement of said caliper unit in response to the rotor movement upon backing;

a relief valve for relieving the hydraulic pressure on said piston to provide the release of the firm braking engagement of the brake pads with the rotor; and actuating means for operating said valve in response to said pivoting movement of said caliper unit, whereby said braking system is effective to provide efficient braking during forward movement and automatic release upon backing.

2. The braking system of claim 1, wherein said housing includes a first section for said piston and one brake pad, adjacent the top of said rotor, and a second section on the opposite side of said rotor for the other brake pad, and means for fastening said second section to said first section for support.

3. The braking system of claim 1, wherein said vehicle includes an axle, said bracket comprising a support ring for direct mounting on said axle.

4. The braking system of claim 3, wherein said bracket includes a yoke above said ring, said pivot pin being positioned between said ring and said yoke, said caliper unit being positioned within the yoke.

5. The braking system of claim 1, wherein said pivot pin mounts said caliper unit for in and out sliding movement in addition to pivoting movement for self-centering with respect to said rotor.

6. The braking system of claim 1, wherein said vehicle includes at least two wheels, said brake assembly with said relief valve forming a master assembly for braking one wheel, a slave brake assembly for braking the second wheel, said hydraulic means including a common feed line for supplying hydraulic pressure to the brake cylinders of both assemblies, said relief valve being operative to relieve the hydraulic pressure to both cylinders.

7. A braking system including a disc brake assembly having brake pads for a trailer or other towed vehicle to provide release of the brake pads from firm braking engagement with a rotor upon backing comprising:

a stationary mounting bracket for attachment to the vehicle for supporting the disc brake assembly;

self-contained hydraulic means for moving the pads into and out of engagement with the rotor in response to the presence and absence of hydraulic pressure for forward braking and backing non-braking modes of vehicle operation, respectively;

a caliper unit including a housing for mounting said pads for relative movement toward and away from said rotor and into and out of engagement therewith;

said hydraulic means including a piston within a brake cylinder in said housing in operative engagement with at least one of said pads to provide said relative movement;

a single pivot pin for securely mounting said caliper unit to said mounting bracket for stable pivoting movement in response to the rotor movement upon backing;

a relief valve for relieving the hydraulic pressure on said piston to provide the release of the firm braking engagement of the brake pads with the rotor;

actuating means for operating said valve in response to said pivoting movement of said caliper unit;

said vehicle including an axle, said bracket comprising a support ring for direct mounting on said axle;

said bracket further including a yoke above said ring, said pivot pin being positioned between said ring and said yoke, said caliper unit being positioned within the yoke; and a fixed stop integral with one upstanding arm of said yoke for limiting the pivoting movement of said caliper unit during normal forward movement, whereby said braking system is effective to provide efficient braking during forward movement and automatic release upon backing.

8. The braking system of claim 7, wherein is provided spring means mounted on the opposite arm of said yoke to urge said caliper unit back toward said stop upon pivoting during backing.

9. The braking system of claim 8, wherein said hydraulic means includes a pressure source and reservoir, a feed line and a return line to and from said cylinder, respectively, said relief valve being mounted on said opposite arm, said actuator means including a stop on said yoke for said valve to allow flow through said return line directly to said reservoir for relieving the hydraulic pressure during pivoting of said caliper unit on said pivot pin during backing.

10. The braking system of claim 9, wherein said relief valve includes a two-way valve element axially aligned with the actuator stop and operable to control flow along said return line to relieve pressure in said brake cylinder in response to engagement with said actuator stop.

11. A braking system including a disc brake assembly having brake pads for a trailer or other towed vehicle to provide release of the brake pads from firm braking engagement with a rotor upon backing comprising:

a stationary mounting bracket for attachment to the vehicle for supporting the disc brake assembly;

self-contained hydraulic means for moving the pads into and out of engagement with the rotor in response to the presence and absence of hydraulic pressure for forward braking and backing non-braking modes of vehicle operation, respectively;

a caliper unit including a housing for mounting said pads for relative movement toward and away from said rotor and into and out of engagement therewith;

said hydraulic means including a piston within a brake cylinder in said housing in operative engagement with at least one of said pads to provide said relative movement;

means for securely mounting said caliper unit to said mounting bracket for stable movement in response to the rotor movement upon backing;

said mounting bracket including a yoke having spaced arms for receiving said housing and restricting movement of said caliper unit to provide additional stability;

resilient means for urging said caliper unit toward one of said arms of said yoke;

a relief valve for relieving the hydraulic pressure on said piston to provide the release of the firm braking engagement of the brake pads with the rotor; and actuating means for operating said valve in response to said movement of said caliper unit, whereby said braking system is effective to provide efficient braking during forward movement and automatic release upon backing.

12. The braking system of claim 11, wherein said spaced arms include:

a stop on said one arm for limiting movement in one direction; and said resilient means being mounted on the other arm for urging said caliper unit toward said stop.

* * * * *